US012656149B2

(12) United States Patent
Haynes et al.

(10) Patent No.: US 12,656,149 B2
(45) Date of Patent: **\*Jun. 16, 2026**

(54) METER READING SCHEMA TO ENHANCE SYSTEM FUNCTIONALITY

(71) Applicant: ACLARA TECHNOLOGIES LLC, St. Louis, MO (US)

(72) Inventors: David Haynes, St. Peters, MO (US); Todd Ellis, Ballwin, MO (US)

(73) Assignee: Aclara Technologies LLC, St. Louis, MO (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/028,677

(22) Filed: Jan. 17, 2025

(65) Prior Publication Data

US 2025/0347533 A1 Nov. 13, 2025

Related U.S. Application Data

(63) Continuation of application No. 16/910,492, filed on Jun. 24, 2020, now Pat. No. 12,203,777, which is a (Continued)

(51) Int. Cl.
G01D 4/00 (2006.01)
G06Q 50/06 (2024.01)
(Continued)

(52) U.S. Cl.
CPC ............. G01D 4/006 (2013.01); G06Q 50/06 (2013.01); H04Q 9/00 (2013.01); H04W 4/70 (2018.02);
(Continued)

(58) Field of Classification Search
CPC ......... G01D 4/002; G01D 4/006; H04W 4/70; G06Q 50/06; H04Q 9/00; H04Q 2209/00;
(Continued)

(56) References Cited

U.S. PATENT DOCUMENTS

| | | | | |
|---|---|---|---|---|
| 4,963,820 A | 10/1990 | Medlin | | |
| 6,393,341 B1 * | 5/2002 | Lawrence | .............. | G06Q 30/04 |
| | | | | 710/72 |

(Continued)

FOREIGN PATENT DOCUMENTS

| | | |
|---|---|---|
| EP | 2897299 | 7/2015 |

OTHER PUBLICATIONS

Author: IEC, Title: Application Integration at Electric Utilities— System Interfaces for Distribution Management—Part 9: Interfaces for Meter Reading and Control, Date: Oct. 2013, pp. 1-16 (Year: 2013).

(Continued)

*Primary Examiner* — Franklin D Balseca
(74) *Attorney, Agent, or Firm* — Michael Best & Friedrich LLP

(57) ABSTRACT

An improvement to a utility (U) meter's (M) meter reading schema. The improvement includes a device (D) responsive to a native language with which a meter is programmed to convert communications to and from the meter from that native language into a neutral language. The neutral language is convertible by other meters programmed with different native languages into the native language of a particular meter for meters programmed with different native languages can communicate with each other. This allows facilities within a localized area of a utility's power grid (G) to form into a micro-grid (MG) in which meters programmed with the same or different native languages can communicate with each other without having communications between them routed through a central location of the utility.

11 Claims, 4 Drawing Sheets

Related U.S. Application Data continuation of application No. 15/718,638, filed on Sep. 28, 2017, now Pat. No. 10,704,924.

(60) Provisional application No. 62/402,099, filed on Sep. 30, 2016.

(51) Int. Cl.
  *H04L 69/329* (2022.01)
  *H04Q 9/00* (2006.01)
  *H04W 4/70* (2018.01)

(52) U.S. Cl.
  CPC ............ *G01D 4/002* (2013.01); *H04L 69/329* (2013.01); *H04Q 2209/60* (2013.01); *Y02B 90/20* (2013.01); *Y04S 20/30* (2013.01)

(58) Field of Classification Search
  CPC ........... H04Q 2209/10; H04Q 2209/40; H04Q 2209/60; H04Q 2209/70; H04Q 2209/80; H04L 69/329; Y02B 90/20; Y04S 20/30
  See application file for complete search history.

(56) References Cited

U.S. PATENT DOCUMENTS

| | | | |
|---|---|---|---|
| 6,836,737 | B2 | 12/2004 | Petite et al. |
| 7,809,854 | B2 | 10/2010 | Jung et al. |
| 8,423,637 | B2 | 4/2013 | Vaswani |
| 8,884,774 | B2 | 11/2014 | Sanderford, Jr. |
| 9,000,945 | B2 * | 4/2015 | Sobotka ................. G01R 31/42 |
| | | | 702/182 |
| 9,332,583 | B2 * | 5/2016 | Moon ................... H04W 76/23 |
| 9,440,193 | B2 | 9/2016 | Lida et al. |
| 2003/0069922 | A1 | 4/2003 | Arunachalam |
| 2008/0018491 | A1 | 1/2008 | Berkman et al. |
| 2008/0074285 | A1 | 3/2008 | Guthrie |
| 2010/0283606 | A1 | 11/2010 | Tsypin et al. |
| 2012/0057592 | A1 | 3/2012 | Zeppetelle et al. |
| 2015/0097694 | A1 | 4/2015 | Laval et al. |
| 2016/0126734 | A1 | 5/2016 | Price et al. |

OTHER PUBLICATIONS

Derhamy et al., "Translation Error Handling for Multi-Protocol SOA Systems," IEEE 20th Conference on Emerging Technologies & Factor Automation, 2015.

* cited by examiner

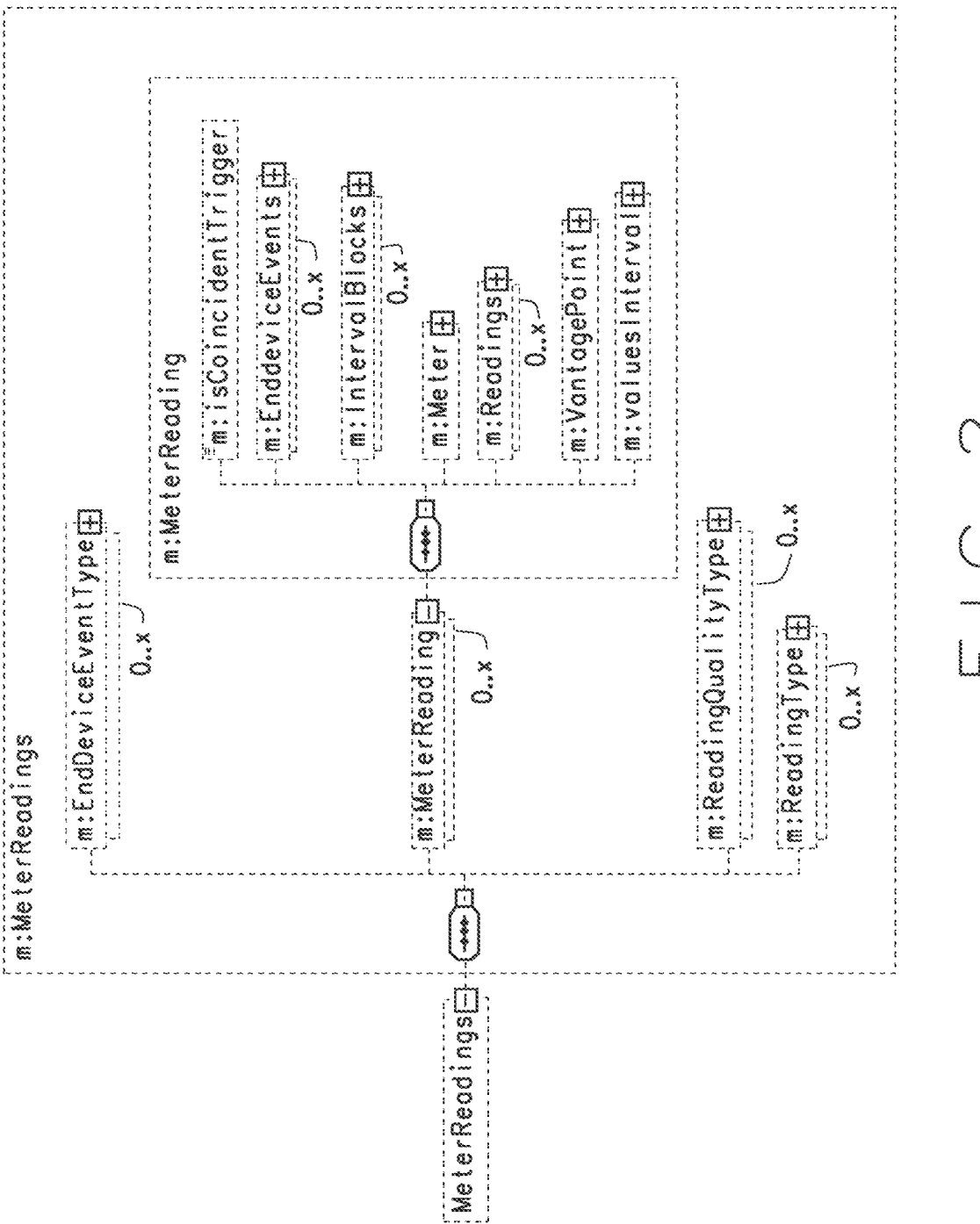
F I G. 2

METER READING SCHEMA TO ENHANCE SYSTEM FUNCTIONALITY

REFERENCE TO RELATED APPLICATIONS

This application is a continuation of U.S. application Ser. No. 16/910,492, filed Jun. 24, 2020, which is a continuation of U.S. application Ser. No. 15/718,638 filed Sep. 28, 2017, now U.S. Pat. No. 10,704,924 which is based on, and claims the benefit of, U.S. provisional patent application 62/402, 099 filed Sep. 30, 2016, each of which is incorporated herein by reference.

BACKGROUND OF THE INVENTION

This invention relates to communications in electric and other utilities; and, more particularly, to a method and improvements for enhanced communications between disparate installations in a utility's distribution system under a wide variety of operational conditions.

A utility supplies a particular commodity (electricity, gas, water) through a distribution system to numerous end users. Each utility has a dedicated supply network or grid by which the commodity is routed from a central station or sites to the location of the respective end users. Itis now commonplace for a measuring device or meter such as a "smart meter" to be installed at each using facility's location, the meter measuring the amount of the commodity dispensed to and/or used at that particular site. Over time communication systems have been developed which enable a central location of the utility to link with and access the user location through the meter to, for example, obtain current commodity usage rates, control use rates of the commodity under certain conditions, etc. Examples of such communication systems include a two-way automatic communications system for a power line carrier or power line communications system (i.e. Aclara Technologies, TWACS®), as well as a radio frequency (RF) system and landline communications systems.

Referring to FIG. 1, a utility U, for example an electric utility, generates electricity which is propagated through power lines L from a central location such as a sub-station S to numerous end user sites such as residential, commercial, or manufacturing establishments or facilities F. It will be understood that while many sites F rely solely on the electricity transmitted over the power lines to operate machinery, systems, and appliances at the facility, some facilities such as facilities F1 and F2 may use local, alternate power sources in addition to the power supplied by the utility. So, for example, facility F1 employs solar panels SP as a primary or secondary source of power; while facility F2 has its own generator G used for this purpose. Regardless, each facility connected to the utility has a meter such as a smart meter M installed at the facility to measure the amount of usage of the commodity (i.e., electricity) supplied to the facility. A communications link C enables correspondence between the utility and each facility connected in the utility's power grid.

Sometimes disruptions occur which prevent the commodity provided by a utility from reaching some or all of the using sites. For example, in an electrical grid, a power line may be downed during a storm or a transformer may be struck by lightning resulting in a power outage. In such instances, querying by the utility's communications system helps identify the location of the outage as well as its extent, so service can be quickly restored.

One problem with today's utility systems is their vulnerability to natural and manmade catastrophes. Computer hackers, for example, have tried to, and in some instances succeeded, in disrupting a utility's operations. Also, there is the increasing threat of terrorists damaging vital portions of the utility's infrastructure incapacitating the utility. It has been known for years that high energy electrical impulses produced by a nuclear explosion can destroy integrated circuit chips which are the heart of the electronics now universally employed throughout homes and industries, including utility systems, causing massive power disruptions.

With respect to natural causes, there is, for example, the susceptibility to solar flares such as those responsible for the so-called Carrington Event of 1859. In that instance, a geomagnetic storm was produced by an intense solar flare. The resulting coronal mass ejection from the sun reached the earth in less than 18 hours and among other things resulted in the failure of telegraph systems throughout North America and Europe. A similar geomagnetic storm in March 1989 disrupted power across large sections of the Quebec province in Canada. Another "Carrington-class" storm occurred in July, 2012, but missed the earth's orbit. Significantly, in 2013, a joint venture including both insurance companies and scientific groups estimated that the current cost of a Carrington event affecting the U.S. could exceed over $1 trillion in damages. (See www.wikipedia.org under the heading "Solar storm of 1859").

There is, accordingly, a need to provide operational safeguards to utilities to protect from, or ameliorate, the effects from the possible occurrence of these events.

In addition to the above, utilities currently employ versions of open communications interconnection (OSI) protocols for communications throughout their communications system to obtain operational data, control operations at particular sites, and confirm that the requested operations are performed. An OSI is characterized by its ability to provide communication functions without regard to a utility's underlying internal structure and the technology employed in the system. As understood by those skilled in the art, an OSI classifies the communications process into a series of interconnected layers defined as follows:

Layer 1—physical layer;
Layer 2—data link layer;
Layer 3—network layer;
Layer 4—transport layer;
Layer 5—session layer;
Layer 6—presentation layer; and,
Layer 7—application layer.

A brief overview of an OSI and each of these layers is found at www.wikipedia.org under the heading "OSI model". A more detailed description of each layer, its functions and operations is found in, for example, Computer Networks, 5th ed., by Tanenbaum and Wetherall.

Those skilled in the art understand that, at each layer, two entities exchange information/data using an established protocol for that layer. The particular characteristics for each layer and the protocols employed thereat are available in the above references, as well as elsewhere, and are not described herein. It is understood, however, that current protocols available to systems' users are adaptable to a particular system application.

As one example, an International Electrotechnical Commission standard; i.e., IEC 61968-0:2013 is used in utility RF communication systems, at the applications layer, to communicate between a central utility location C, as indicated in FIG. 1, and meters M installed at using sites or facilities F. The IEC 61968-0:2013 standard has different schema (i.e., 48 schema) defined for respective purposes of a communication. One such schema is, for example, to request a meter reading at a site F, and to report the meter reading back to the central location.

A problem with the present schema is that even though some of them are quite large, they are still not necessarily adequate to meet a utility's need for certain applications. Also, the current schema is somewhat cumbersome. For example, a "read meter" request in the IEC 61968-0:2013 format is formulated as a string, and an extensive technique (not described) is required to build an identifier which describes the unit of measure for an electric meter M's measurement. The format uses both whole numbers (integers) and dots (".").

Thus, to request a typical dial reading off the face of a residential electricity meter M, the identifier used in an Application Programming Interface (API) would be, for example, 0.0.0.1.4.1.12.0.0.0.0.0.0.0.3.72.0, the construction rules specifying 18 fields composed of characters; i.e., the digits and the dots.

SUMMARY OF THE INVENTION

The present invention is directed to improvements in electric utility meter reading schema to enhance the functionality of a utility's communication system. The improvements facilitate the creation of appropriate messages sent to facilities using programming techniques which both simplify the message as well as increase the number and types of messages transmitted; the latter enabling a utility to define custom "parameters" which are read, written, and interpreted in the same manner as with other standardized message formats.

The improvements include conversion of a device's native language (the language with which the device was programmed) into a neutral language for carrying messages from a point of origination or Head End to a receiving location or End Point so devices having different native languages can readily communicate with each other. This creates an opportunity for an "Internet of Things" capability.

The improvements enable facilities within a local area; i.e., a micro-grid, of a utility to employ alternate channels of communications between them in the event regular communications fail for some reason so that these facilities can reliably communicate back-and-forth separately from the utility's normal communications channels until normal communications are restored. Facilities within the locale (micro-grid) are now able to check on each other's status, carry out emergency operations at a particular site, if necessary, and otherwise assist each other during the event without having to be routed through the utility's central communication facility. Doing so permits de-centralized communications.

The improvements enable "end point" configurability; i.e., the ability to set up a communications module within a smart meter located at a particular site (an end point) while not affecting either normal communications at that site, or communications with other meters at other locations.

Further, the improvements facilitate communications between dissimilar devices; e.g., meters made by different manufacturers or which use different language protocols so to eliminate problems resulting from the use of dissimilar equipment within the system.

The improvements, which are facilitated by a device located at a "head end" location such as a substation of a utility's distribution grid, enhance OSI communications protocols at the applications level of the utility's communications system.

Corresponding reference characters indicate corresponding parts throughout the several views of the drawings.

BRIEF DESCRIPTION OF THE DRAWINGS

FIGS. 2-4 illustrate an IEC 61968-9 schema for meter readings and end device events.

DETAILED DESCRIPTION OF THE INVENTION

Figure 1:
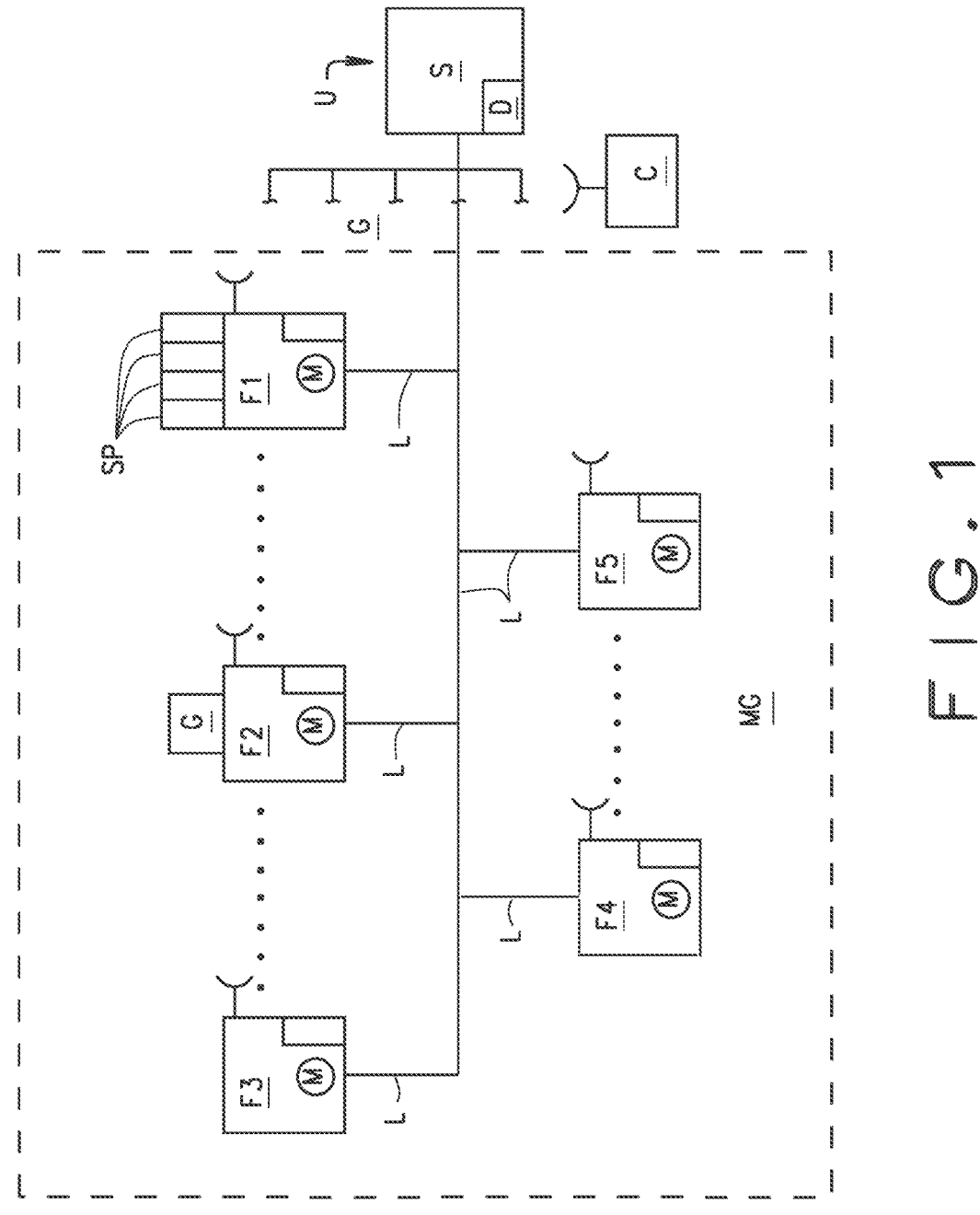
FIG. 1 is a simplified representation of a utility's power grid.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Figure 3:
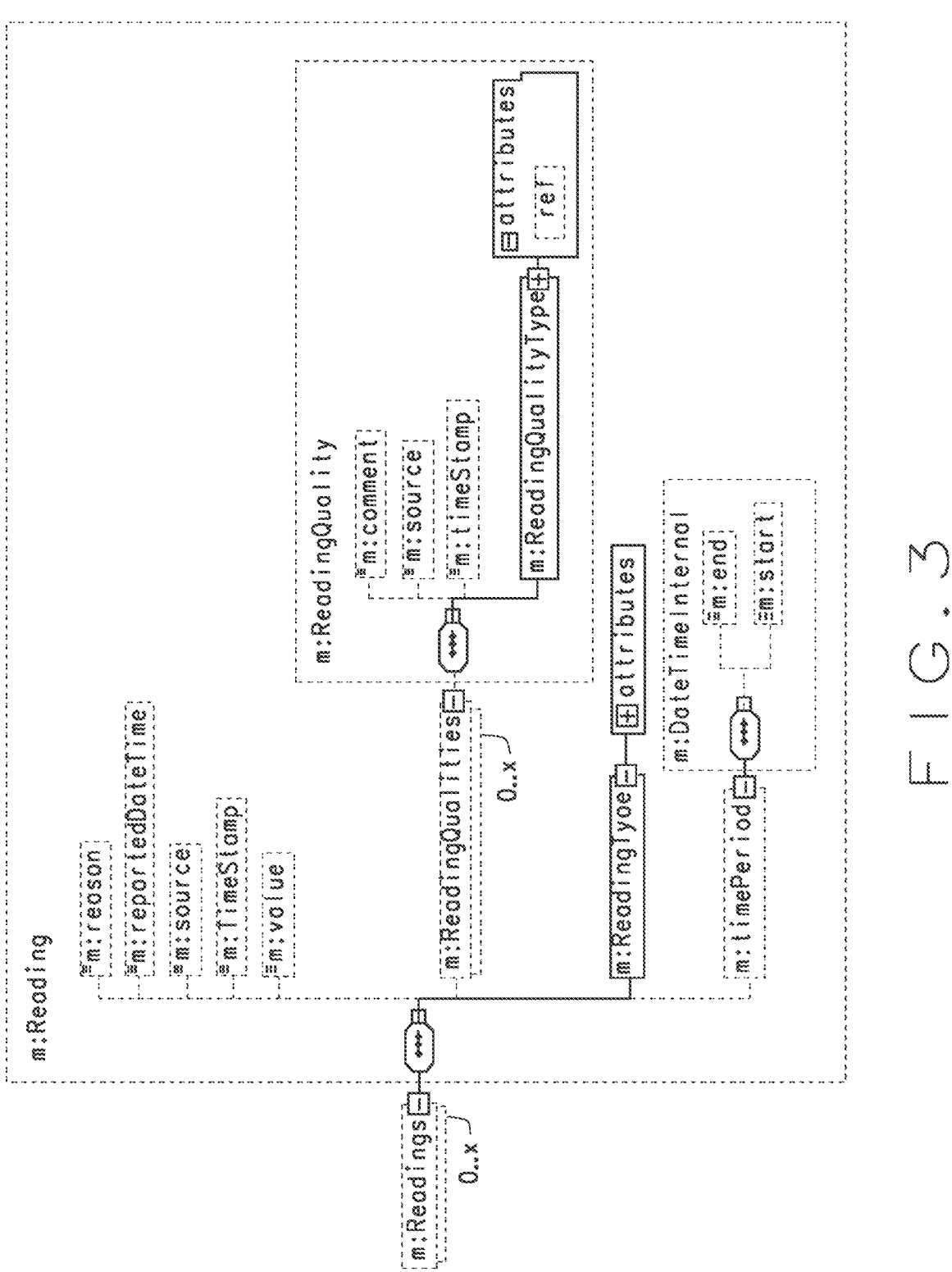
Figure 4:
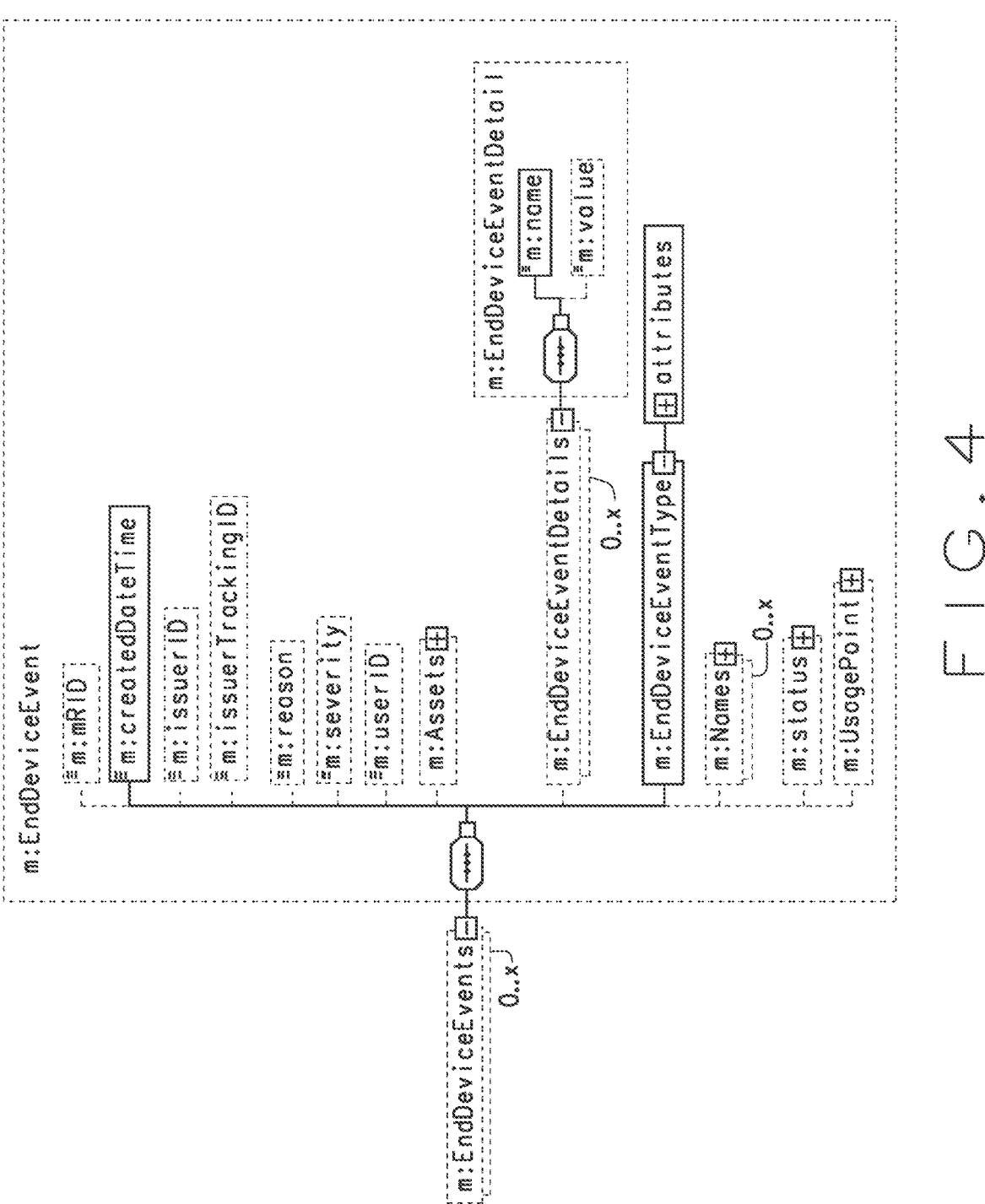

In accordance with the present invention, a smart meter M utilizes the IEC 61968-9:2013 (hereinafter "Part-9") schema standard as a neutral language. As such, the Part-9 standard supports operation of any smart meter M, regardless of its source of manufacture, including system control and data acquisition (i.e., SCADA) operations. The Part-9 standard can be extended as required and is used to define or "map" each meter in the original or "native" language with which the meter was programmed during its manufacture. An example of the use of the Part-9 schema for reading a meter, for example, is shown in FIGS. 2-4.

In accordance with the invention, a translation protocol or device D converts the native language of a meter into the neutral language which, once implemented, provides a common semantic understanding between a message's sender, which is sometimes referred to as the "Head End" or "HE", and the message's receiver, which is sometimes referred to as the "End Point" or "EP". As previously noted, this neutral language is employed at the application layer of a protocol stack. Device D may be located at a substation S as shown in FIG. 1 or other convenient Head End location.

In operation, translating device D services one or more native languages including: ANSI C12, IEC-61850, DNP, SEP, DLMS/COSEM, other standard application-layer languages, and other proprietary application-layer languages.

Translating device D is installed outside of the equipment; e.g., meters M, which are issuing or receiving messages; and, it can be integrated into a communication module located at a Head End facility, substation S, for example, to provide translation within a communications channel. Further, each meter has a communications module programmable to communicate with meters programmed for a different native language.

In FIG. 1, be bi-directional communications over a grid G of the utility are routed through a central controller located at the substation. In such a communications scheme, translation is also bi-directional. Accordingly, an end point or meter M is able to communicate back to a central controller located at substation S and can also route traffic to other devices connected via the same central controller. This is done using Internet Protocols versions 4 or 6 (1Pv4, 1Pv6) or a Network Address Translation (NAT) protocol to communicate back to the central controller and be backhauled to a Head End. Data acquired by a meter M or other equipment is routed to a back office advanced metering interface (AMI) Head End as well as to a back office SCADA Head End or a centralized or back office energy management system (EMS).

An advantage of the above is that in addition to communications over the utility's grid G, it is now possible for communications within a localized area such as the micro-grid MG designated in FIG. 1 to be performed. Situations where communications within a micro-grid are desirable done; i.e., acquire data, perform a function, etc. On the equipment side, specific neutral parameters are mapped to specific native parameters. The formats of both are specified, along with a conversion formula.

An example of a mapping from an end point's native language to and from the neutral language is provided below. Preferably, mappings are maintained in a tabular form but can be expressed in BPEL (Business Process Execution Language), OWL (Ontology Web Language), as well as other means.

| Neutral Language | | Native Language | |
|---|---|---|---|
| Reading Type ID | Reading Type Description | Format | ANSI C12.19 Location |
| 0.0.0.1.1.1.12.o.o.o.o.o. 0.0.0.3.72.0 | bulkQuantity forward electricitySecondaryMetered energy (kWh) | Decimal | TOTAL_DEL_KWH (MFG Table 19, Length 4B, Offset 4B) |
| 0.0.0.1.20.1.12.o.o.o.o 0.0.0.0.3.72.0 | bulkQuantity total electricitySecondaryMetered energy (kWh) | Decimal | TOTAL_DEL_PLUS_RCVD_KWH (MFG Table 19, Length 4B, Offset 8B) |
| 0.0.0.1.4.1.12.0.0.0.0.0. 0.0.0.3. 72.0 | bulkQuantity net electricitySecondaryMetered energy (kWh) | Decimal | TOTAL_DEL_MINUS_RCVD_KWH (MFG Table 19, Length 4B, Offset 12B) |
| 0.0.0.1.19.1.12.0.0.0.0.0. 0.0.0.0.3.72.0 | bulkQuantity reverse electricitySecondaryMetered energy (kWh) | Decimal | TOTAL_REC_KWH (MFG Table 19, Length 4B, Offset 16B) | include those where network wide communications are halted due to a storm or other natural causes as well as manmade incidents. In such instances, the improvements of the invention now allow the facilities F1-F5 in FIG. 1 to communicate with each other, but not necessarily to substation S or other sections of the utility grid, so to determine the operational status at each facility, any configuration changes needed at a facility in order for continued functioning of equipment at the facility, and data acquisition. Since the meters or other equipment at one facility may not necessarily be the same as that at other facilities within micro-grid MG, the ability to go from a native language to a neutral language allows communications to timely occur locally without requiring communication backhaul to a central office such as substation S.

Within micro-grid MG, the local communications are point-to-point or peer-to-peer, and are routed through the micro-grid's communication infrastructure without reaching a Head End. The communications are routed through the meters M at the various facilities F1-F5 to, for example, consumer appliances, in-home displays, utility distribution automation including, for example:

capacitor bank controllers, transformer tap changers, switch reclosers, micro-grid controllers, inverters, and distributed generation equipment;

demand response applications for load control and price response, etc.;

outage detection and power restoration management equipment including lineman diagnostic tools; and, health monitoring equipment.

A distributed micro-grid controller, for example, allows inputs for a locally determined action such as distribution-side voltage sag so to inform a storage battery array that it needs to begin to provide an output to meet load demands.

With regard to mapping, as previously noted, the IEC 61968-9 standard has been selected as the neutral language. Mappings created between the neutral language and the equipment's native language entail an equivalency between a "restful" architecture and the equipment's native architecture. On the restful side, a resource and a verb are identified to perform a particular action. On the equipment side, this involves a process workflow usually including "reading" or "writing" data elements, and possibly the creation and close-out of secure sessions. Further on the restful side, parameters are supplied to specify exactly what is to be The following example is for a meter reading definition. A conversion formula is also supplied in Y56109FDS:

$$Ke = \frac{Mp \times Kh}{1000}, \quad \text{Equation I}$$

The definition of Ke for Metered Usage (Secondary Reading)

$$EnergykWh, = \left(Energy_{pulses} \times Kex\ Rp\right) + Initia\,/\,Offsetkwh, \quad \text{Equation 2}$$

BulkQuantity Energy Pulses to kWh conversion Where,

EnergykWh = Energy in its finished form as a useable business value.

Energypulses = Energy in a raw form from the meter

Mp, is the number of meter disk revolutions per pulse. (This value may be used to normalize pulses. For electromechanical meters it is customarily computed as the 1/"the number of stripes on the disk". For solid-state meters, this is ratio of normalized pulses to actual pulses).

Kh, is the number of Watt-hours per disk revolution.

$Rp =$

AMR decompression scalar. (Normally, for usage calculations $Rp = 1$).

InitialOffsetkWh = The value determined at time of integration which defines the difference between the dial reading and the corresponding register reading expressed in kWh.

Importantly, use of a neutral language to carry messages creates opportunities for an Internet of Things capability. To achieve this, adapters or translating devices D are built at each end of a communications network to convert the neutral language to the local or native language. An exception to this would be a utility's back office since the language chosen as the neutral language is the language of the back office. Future developments include developing an enclosure that contains a device D and a communications synergization module that allows almost any distribution automation (DA) device to be connected into the system. The DA devices would have autonomous analysis capabilities to communicate with meters M so to obtain field environment conditions such as voltage or demand.

In view of the above, it will be seen that the several objects and advantages of the present disclosure have been achieved and other advantageous results have been obtained.

The invention claimed is:

1. A method of communicating between a plurality of facilities in a utility distribution network, each of the plurality of facilities includes a smart meter, the method comprising:

converting a message, of the smart meter, from a first native language to a neutral language;

wherein the message in the first native language is converted using a formula, wherein the formula is:

$$\text{Energy}_{kWh} = \left(\text{Energy}_{pulses} \times Ke \times Rp\right) + \text{InitialOffset}_{kWh}$$

wherein $\text{Energy}_{kWh}$ is energy in its finished form as a useable business value, $\text{Energy}_{pulses}$ is energy in a raw form from the smart meter, Ke is metered usage, Rp is an AMR decompression scalar, and $\text{InitialOffset}_{kWh}$ is a value determined at time of integration which defines a difference between a dial reading and a corresponding register reading.

2. The method of claim 1, further comprising:

receiving, via a second smart meter, the message in the neutral language.

3. The method of claim 2, further comprising:

converting the message in the neutral language to a second native language of the second smart meter.

4. The method of claim 1, wherein the message in the first native language is converted to the neutral language via at least one selected from a group consisting of the smart meter and a central controller.

5. The method of claim 1, wherein the neutral language is the language of a central controller.

6. The method of claim 5, wherein the central controller is remote from the smart meter.

7. The method of claim 1, wherein the smart meter is configured to, in a first mode, generate the message in the first native language of the smart meter and transmit the message to a central controller of a substation of the utility distribution network, and in a second mode, generate the message in the first native language of the smart meter and transmit the message to a second facility of the plurality of facilities, wherein when in the second mode, the message is not forwarded to the central controller from a second smart meter of the second facility of the plurality of facilities.

8. The method of claim 1, wherein the neutral language is a IEC 61968-9:2013 schema standard.

9. The method of claim 1, wherein the first native language is a language selected from a group of languages consisting of ANSI C12, IEC-61850, DNP, SEP, DLMS/COSEM, a separate standard application-layer language, and a proprietary application-layer language.

10. The method of claim 1, wherein the plurality of facilities constitute a micro-grid of the utility distribution network.

11. The method of claim 1, wherein the neutral language is employed at an application layer of a protocol stack of an open communications interconnection protocol for the utility distribution network.

* * * * *